United States Patent [19]
Garber

[11] 3,907,824

[45] Sept. 23, 1975

[54] PREPARATION OF 1-ALKYL-3,5-DIPHENYLPYRAZOLES AND 1,2-DIALKYL-3,5-DIPHENYLPYRAZOLIUM SALTS

[75] Inventor: Murray Garber, Trenton, N.J.

[73] Assignee: American Cyanamid Company, Stamford, Conn.

[22] Filed: June 18, 1973

[21] Appl. No.: 371,202

[52] U.S. Cl............... 260/310 R; 260/311; 424/273
[51] Int. Cl.².................................... C07D 231/12
[58] Field of Search.................. 260/310 R, 311

[56] References Cited
UNITED STATES PATENTS

| | | | |
|---|---|---|---|
| 3,014,916 | 12/1961 | Wright | 260/310 |
| 3,395,155 | 7/1968 | Gubler | 260/310 |

OTHER PUBLICATIONS

Grandberg, Khim. Geterotsikl. Soedin., Akad., Nauk Latv. SSR 1965 (2), 279–283 (cited as C.A. 63:8339–8340.

*Primary Examiner*—Henry R. Jiles
*Assistant Examiner*—C. M. S. Jaisle
*Attorney, Agent, or Firm*—Harry H. Kline

[57] ABSTRACT

There is provided a novel process for the preparation of 1-alkyl-3,5-diphenyl(substituted or unsubstituted)-pyrazole and a method for converting said compound to a 1,2-dialkyl-3,5-diphenyl(substituted or unsubstituted) pyrazolium salt.

16 Claims, No Drawings

PREPARATION OF 1-ALKYL-3,5-DIPHENYLPYRAZOLES AND 1,2-DIALKYL-3,5-DIPHENYLPYRAZOLIUM SALTS

The present invention also relates to a novel method for converting a 1-alkyl-3,5-diphenylpyrazole to the herbicidally effective 1,2-dialkyl-3,5-diphenylpyrazolium salt illustrated by the formula:

(I)
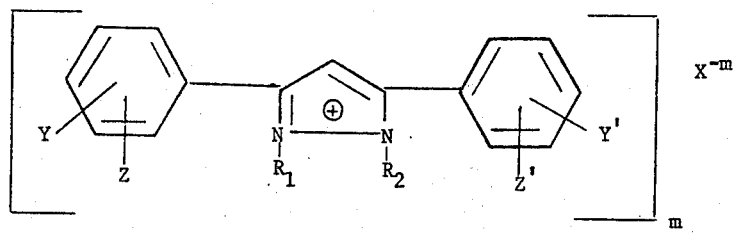

wherein $R_1$ and $R_2$ each represent alkyl groups having 1 to 4 carbon atoms; Y, Y', Z and Z' each represent hydrogen, nitro, halogen, alkyl of from 1 to 4 carbon atoms, haloalkyl of from 1 to 4 carbon atoms or lower alkoxy; X represents an anion having a charge of from 1 to 3; and m is an integer from 1 to 3. More particularly, the invention relates to a method wherein a 1-alkyl-3,5-diphenylpyrazole is quaternized in a selected co-solvent system hereinafter described.

In accordance with the process of the present invention, 1-alkyl-3,5-diphenylpyrazoles having the formula:

(II)
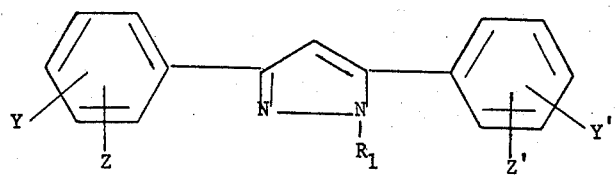

where $R_1$ is alkyl $C_1$—$C_4$ and Y, Y', Z and Z' each represent a member selected from the group consisting of hydrogen, nitro, halogen, alkyl $C_1$—$C_4$, haloalkyl $C_1$—$C_4$ and alkoxy $C_1$—$C_4$; are initially prepared by reacting a 3,5-diphenyl (substituted or unsubstituted)-pyrazole with an equimolar amount or excess (i.e. 1 to 1.5 moles) of an alkylating agent in the presence of a solid, anhydrous, inorganic alkali metal base and a non-aqueous, inert, organic solvent. In general, the reaction is carried out at a temperature between about 80°C. and 175°C., and preferably between 85°C. and 120°C. Where a low boiling solvent such as ethanol is used, the above temperature can be achieved by conducting the reaction at superatmospheric pressure.

As employed herein, the term "halogen" is intended to mean fluoro, chloro, bromo or iodo; the term "alkyl $C_1$—$C_4$" is intended to mean straight and branched chain alkyl groups of from 1 to 4 carbon atoms; the term "alkoxy $C_1$—$C_4$" is intended to include straight and branched chain alkoxy groups, and the term "haloalkyl $C_1$—$C_4$" is intended to include straight or branched chain alkyl groups substituted with from 1 to 4 halogens selected from the group consisting of fluoro, chloro, and bromo.

Illustrative alkylating reagents include alkyl halides, dialkyl sulfates, alkyl phosphates, alkyl hydrogen sulfates and alkyl toluene solfonates. Among the preferred alkylating reagents are alkyl halides, such as methyl, ethyl, n-propyl, isopropyl, n-butyl and isobutyl chlorides and bromides; dialkyl sulfates, alkyl hydrogen sulfates, and alkyl toluene sulfonates.

Suitable solvents which can be employed in the preparation of the pyrazole intermediates are non-aqueous, inert, organic solvents, preferably selected from aromatic hydrocarbons, such as benzene, toluene and xylene and high aromatic solvents having a mixed aniline point between 30°F. and 95°F., an aromatic content between 60% and 100% and a specific gravity at 60°/60°F. between 0.88% and 1.5; $C_6$—$C_{10}$ aliphatic hydrocarbons, such as hexane and heptane; ketones having from 4 to 7 carbon atoms, such as methylisobutylketone, methylbutylketone, cyclohexanone, or the like; alcohols having from 2 to 8 carbon atoms, and preferably 3 to 4 carbon atoms; polar aprotic solvents, such as dimethyl sulfoxide, dimethylformamide, acetonitrile, nitrobenzene, N,N-dimethylacetamide, tetrahydrosulfolane, ethylenedichloride, perchloroethylene, alkoxyalkyl ethers, such as bis-methoxy ethyl ether, and cyclic ethers, such as dioxane and tetrahydrofuran.

As suitable inorganic bases are solid, anhydrous, inorganic alkali metal bases. They are moderate to strong bases, such as, sodium hydroxide, potassium hydroxide, sodium carbonate and potassium carbonate, calcium oxide or calcium hydroxide.

The above reaction may be graphically illustrated as follows:

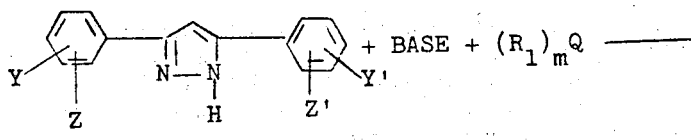

(III)

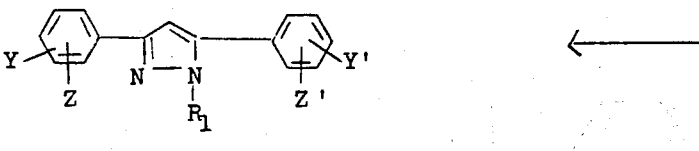

(II)

wherein $R_1$, Y, Y', Z and Z' are as described above; Q is the remaining portion of the alkylating agent, as, for example, halide, such as chloride, bromide or iodide; sulfate; hydrogen sulfate; benzene sulfonate; $C_1-C_4$ alkoxy benzene sulfonate; $C_1-C_3$ alkyl benzene sulfonate, preferably a toluene sulfonate, such as p-toluene sulfonate; phosphate; alkane sulfonate $C_1-C_4$; and $m$ is an integer from 1 to 3.

Illustrative anions suitable for use in the present invention are: halides; sulfate; hydrogen sulfate; methyl sulfate; benzene sulfonate; $C_1-C_4$ alkoxy benzene sulfonate; $C_1-C_3$ alkyl benzene sulfonate; phosphate and alkane sulfonate $C_1-C_4$.

Examplary of the pyrazolium salts of formula (I), it is to be understood that certain multivalent anions, such as sulfate, phosphate, and the like, may have associated with them a cation in addition to the pyrazolium cation, as for example a proton or an alkali metal or alkaline earth metal. For simplicity, such anions are portrayed as being un-ionized, although they probably are, in fact, further ionized. Typical representations are: $NaSO_4^-$, $KPO_4^-$, $MgPO_4^-$, $HSO_4^-$, $NaHPO_4^-$, $NaHPO_4^-$, and the like.

Conversion of the formula (II) above, 1-alkyl-3,5-diphenylpyrazole to the formula (I) 1,2-dialkyl-3,5-diphenylpyrazolium salt is achieved by reacting the pyrazole (II) with an equimolar amount or a slight excess of an alkylating reagent ($R_2$) Q, where $R_2$ is alkyl $C_1-C_4$ and Q is as described above. Alkylating reagents that can be used are selected from the group described above; however, preferred alkylating reagents for conversion of the formula (II) pyrazole to the formula (I) pyrazolium salt are advantageously selected from the group consisting of alkyl halides, dialkyl sulfates, alkyl hydrogen sulfates and alkyl toluene sulfonates. They are used in equimolar amounts together with the pyrazole reactant or in a slight excess, namely, from about 1 to 1.5 moles per mole of pyrazole.

In general, the quaternization reaction is carried out in the presence of a non-aqueous mixture of inert organic solvents consisting of (a) a chlorinated hydrocarbon solvent and (b) an organic solvent selected from the group consisting of aromatic hydrocarbons, aliphatic hydrocarbons, high aromatic solvents of the Panasol type manufactured by Amoco Chemical Corporation and defined above, ketones, alcohols, alkoxyalkyl ethers, dipolar aprotic solvents and cyclic ethers as defined above. Preferred mixtures generally consist of from about 10% to 90%, preferably 25% to 75%, by volume of a solvent in which the quaternarized diphenylpyrazolium salt (I) is relatively insoluble, and from about 90% to 10%, preferably 75% to 25%, of a solvent in which the quaternarized diphenylpyrazolium salt is relatively soluble. Co-solvent systems which meet the above requirements as to percent composition are prepared from aromatic hydrocarbon solvents in admixture with chlorinated hydrocarbon solvents or aliphatic hydrocarbon solvents in admixture with chlorinated hydrocarbon solvents or highly aromatic, Panasol type solvents in admixture with chlorinated hydrocarbons. Particularly efficacious are xylene-ethylene dichloride mixtures. The latter compositions are especially useful, since they provide a readily filterable, flowable slurry from which the quaternarized diphenylpyrazolium salt (I) is easily recovered. Monosolvent systems consisting of aromatic hydrocarbons, aliphatic hydrocarbons, or Panasol type solvent may also be used to produce the quaternized diphenylpyrazolium salt (I) in good yield; however, such systems require about two to three times the amount of solvent required by the co-solvent system in order to obtain a manageable filtration slurry of the quaternized product (I) at the end of the reaction, thus reducing reactor productivity. In addition, the more dilute solvent system reduces the quaternization reaction rate by a factor of two. The use of the co-solvent system assures excellent yields of very high purity product. Regardless of whether the alkylation step is carried out in a single solvent or in solvent mixture, the temperature of the reaction mixture is generally maintained between about 50°C. and 175°C., and preferably between 60°C. and 150°C.

The reaction mixture containing the pyrazolium salt is cooled and the pyrazolium salt (I) then separated from the reaction mixture by filtration. Alternatively, the reaction mixture may be treated with a tertiary-amine to destroy residual alkylating agent, cooled and then centrifuged, filtered, or the like, to recover the crystallized pyrazolium salt (I). In another alternative procedure, the pyrazolium salt (I) is extracted with water from either of the above-mentioned reaction mixtures. The water solutions thus obtained may then be employed directly in the control of undesirable plant species. Where the alkylating reagents employed are volatile, such as methyl chloride, the reaction is carried out in a sealed vessel under pressure to avoid loss of reactants.

It is a good practice when employing a relatively toxic alkylating reagent, such as dimethyl sulfate, in the above reaction to remove any remaining reagent at the end of the reaction. This is accomplished by heating at a temperature of about 50°–60°C. the reaction mixture with a small amount of an anhydrous tertiary-amine, such as triethlamine, trimethylamine or pyridine. Advantageously, improved safety is attained in the handling of the reaction mixture and product produced, particularly in large scale operations.

The process of this invention is of particular importance in the manufacture of 1-methyl-3,5-diphenylpyrazole and the conversion thereof to 1,2-dimethyl-3,5-diphenylpyrazolium methyl sulfate. The latter compound is a highly effective herbicidal agent. Moreover, said compound is especially useful, since it is selective for the control of wild oats in the presence of a wide variety of small grains, such as barley, rape, wheat and rye. The instant process permits the preparation of greater than 96% purity 1-methyl-3,5-diphenylpyrazole from 3,5-diphenylpyrazole in yields of over 90%. The product contains no unreacted 3,5-diphenylpyrazole when prepared under the preferred reaction conditions set forth above. Moreover, under the specified conditions, the methylation reaction is complete within about 0.5 hour or less, and very little dimethylation occurs. After washing with aqueous base and water, the solvent, preferably xylene, containing essentially pure 1-methyl-3,5-diphenylpyrazole, is concentrated to about 25% of its original volume, and the solution is employed directly for the preparation of the 1,2-dimethyl-3,5-diphenylpyrazolium methyl sulfate salt.

The 1-methyl-3,5-diphenylpyrazole-xylene solution obtained from the above reaction is mixed with an amount of ethylene dichloride approximately equivalent to the amount of xylene remaining in the concentrated pyrazole-xylene solution. The mixture is then heated to a temperature of about 50°C. to 55°C. There is then added at least an equimolar amount, preferably a slight excess (i.e., 1 to 1.5 moles) of dimethyl sulfate or any equivalent thereof. The mixture is stirred and heated between approximately 90°C. and 110°C. for about 4 hours. The reaction mixture is cooled to 50°C., and anhydrous triethylamine, equivalent to the excess of dimethyl sulfate used, is added. The reaction mixture is stirred at 50°C. for 30 minutes and then cooled to about 15°C. and the crystallized product separated from the solvent. Any convenient means of separation may be employed, as for example, by centrifugation, filtration, decantation or the like. The product cake is washed with an aromatic solvent, such as xylene, then with a lower ketone, such as acetone, and finally dried. Alternatively, the product cake may be dissolved in water and the aqueous solution thus prepared employed as such for the control of undesirable plant species.

The process of this invention is surprisingly unique, since all previous attempts to prepare 1-methyl-3,5-diphenylpyrazole without using an anhydrous inorganic alkali metal base, an essential and critical requirement in the instant process, resulted in an incomplete N-mono-methylation reaction with substantial quantities of unreacted 3,5-diphenylpyrazole remaining. In comparison, the use of an anhydrous, inorganic, alkali metal strong base produces as an intermediate, the reactive alkali metal (M) salt of the 3,5-diphenylpyrazole,

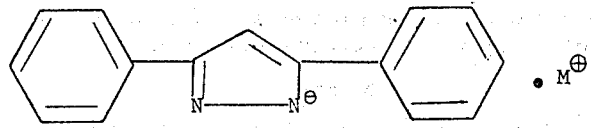

which reacts with dimethyl sulfate rapidly to form 1-methyl-3,5-diphenylpyrazole.

The formation of the alkali metal salt of the 3,5-diphenylpyrazole with anhydrous, inorganic bases in an inert solvent is indeed surprising, since the literature suggests only the use of very strong and generally expensive bases, such as sodium methylate, sodium hydride, lithium amide and sodamide, for N-alkylation reactions via the amine anion with dimethyl sulfate, diethyl sulfate and alkyl halides. Moreover, the literature suggests only the use of aqueous solutions of alkali metal inorganic bases in N-alkylation reactions in protic solvents. In such systems, the yields of desired products are indeed low.

In the present practice, there are employed 3,5-diphenylpyrazole and the substituted derivatives thereof, which are the starting materials for the process of this invention. These are known and can be prepared by several process techniques. The compounds are represented by the formula:

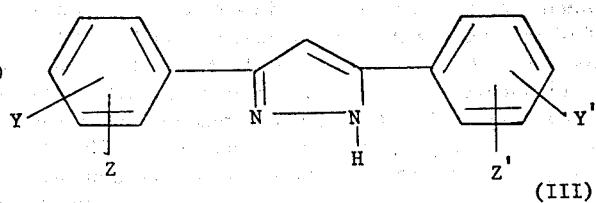

(III)

where Y, Y', Z and Z' are as described above. The compounds can be prepared from dibenzoyl methane or suitably substituted dibenzoyl methanes. These latter compounds are commercially available or may be conveniently prepared by a variety of procedures well known in the chemical literature from readily available starting materials, such as the appropriately substituted acetophenone and appropriately substituted benzoic acid compounds or esters thereof.

In practice, dibenzoyl methane, or a substituted derivative thereof, such as, 1,3-propanedione, 1-(o-fluorophenyl)-3-phenyl- or 1,3-propanedione, 1-phenyl-3-m-tolyl, is reacted with hydrazine at an elevated temperature to yield the desired 3,5-diphenylpyrazole (substituted or unsubstituted). Since the diketone and hydrazine combine in equimolar quantities, it is preferable to maintain the molar ratio of reactants at about 1:1; however, a slight excess (about 10%) of either reactant may be used.

The ring-forming reaction between hydrazine and the diketone is preferably carried out by combining the reactants in a solvent and heating to the reaction temperature. Suitable temperatures are in the range of from about 70°C. to about 150°C., and preferably between 80°C. and 120°C. Suitable solvents include, for example, aprotic solvents, such as xylene, toluene, benzene, pyridine, dimethylsulfoxide, dimethylformamide, and the like, or protic solvents, such as $C_1$—$C_4$ alcohols, preferably n- and iso - propanol. Where the latter solvents are employed, high rates of conversion are obtained at temperatures in the range of 80°C. to 85°C.

The invention will be further illustrated in conjunction with the following examples which are to be taken

EXAMPLE 1

Preparation of 1-methyl-3,5-diphenylpyrazole 5.0 Grams (0.023 mole) of 3,5-diphenylpyrazole is dissolved in 40 ml. of methylisobutylketone. 3.76 Grams (0.027 mole) of solid anhydrous potassium carbonate is added and the mixture heated to 90°C. 3.43 Grams of dimethyl sulfate is added, and the mixture heated at 112°C. to 115°C. for 1.5 hours. After 1.5 hours, essentially no unreacted 3,5-diphenylpyrazole remains. The reaction mixture is cooled to 50°C., and the organic phase containing some undissolved solids (water soluble) is washed with 10 ml. of dilute NaOH. The organic layer is washed twice with 10 ml. water. For yield determination, the methylisobutylketone is removed in vacuo, producing 4.0 grams (75% yield) of an oil which crystallizes on standing. The product has a melting point of 52°C. to 53°C.

EXAMPLE 2

Preparation of 1-methyl-3,5-diphenylpyrazole 5.0 Grams (0.023 mole) of 3,5-diphenylpyrazole is dissolved in 25 ml. of methylisobutylketone. 1.1 Grams of solid anhydrous sodium hydroxide (0.0275 mole) is added, and the mixture heated to 90°C. 3.43 Grams (0.0275 mole) of dimethyl sulfate is added, and the mixture heated to 112°C. to 115°C. The reaction mixture is sampled after 1.5 hours, and no unreacted 3,5-dimethylpyrazole is detected. The reaction mixture is cooled to 50°C., and 30 parts of water added. The pH is adjusted to 11–12 by addition of aqueous sodium hydroxide. The organic layer is washed twice with 30 parts of water. For yield determination, the methylisobutylketone is removed in vacuo, yielding 4.95 grams (93% crude yield) of an oil which crystallizes on cooling to a solid having a melting point of from 52°C. to 53°C.

EXAMPLE 3

Preparation of 1-methyl-3,5-diphenylpyrazole 10.0 Grams (0.0454 mole) of 3,5-diphenylpyrazole is dissolved in 50 ml. of xylene containing 2.62 grams (0.0655 mole) of solid anhydrous sodium hydroxide. The reaction mixture is heated to 110°C., and 6.9 grams (0.0547 mole) of dimethyl sulfate added and the mixture heated at 107°C. to 115°C. After about 30 minutes at reflux, the reaction mixture is cooled to 60°C., and 25 ml. water added. The pH is adjusted to 10 to 11 with 5 ml. of 25% aqueous sodium hydroxide. The organic layer is washed twice with 25 ml. of water. For yield determination, the xylene is stripped in vacuo, producing 9.65 grams of an oil which crystallizes on seeding (melting point 53°C. to 56°C.). Analysis shows material to be 96.6% pure 1-methyl-3,5-diphenylpyrazole. Real yield is 87.5%.

EXAMPLE 4

Preparation 1-methyl-3,5-diphenylpyrazole 20.0 Grams (0.0908 mole) of 3,5-diphenylpyrazole is dissolved in 100 ml. xylene containing 7.26 grams (0.1816 mole) of solid anhydrous sodium hydroxide. The reaction mixture is heated to 120°C., and 13.8 grams (0.109 mole) of dimethyl sulfate added. The reflux temperature dropped to 95°C., and after 15 minutes at 95°C., a reaction mixture sample indicated no detectible unreacted 3,5-diphenylpyrazole. After 30 minutes, the reaction mixture is cooled to 80°C., and 50 ml. of water added. Fifty percent aqueous NaOH is added to bring the pH of the aqueous phase to 10 to 11.0. The organic layer is washed twice with 50 ml. of water. For yield determination, the xylene is removed in vacuo, producing 19.7 grams of an oil which crystallized on seeding. Analysis of the product showed it to be 98.5% pure. The real yield is 91.6%.

EXAMPLES 5 THROUGH 10

Preparation of 1-methyl-3,5-diphenylpyrazole

Attempts to prepare 1-methyl-3,5-diphenylpyrazole without using anhydrous alkali metal base and a non-aqueous solvent have resulted in mixtures of unreacted 3,5-diphenylpyrazole and 1-methyl-3,5-diphenylpyrazole. Unsuccessful methods which were attempted are set forth in Table I below.

The procedure used was that procedure described in Example 4 above. All experiments utilized dimethyl sulfate, but a plurality of bases were substituted for solid anhydrous sodium hydroxide. In some instances, diverse solvents were also substituted for xylene.

Table I

| Example Number | Results |
|---|---|
| 5 | Aqueous NaOH (25%) in xylene resulted in unreacted 3,5-diphenylpyrazole |
| 6 | Aqueous NaOAc (10%) in xylene resulted in unreacted 3,5-diphenylpyrazole |
| 7 | No base added resulted in unreacted 3,5-diphenylpyrazole |
| 8 | Aqueous NaHCO$_3$ resulted in unreacted 3,5-diphenylpyrazole |
| 9 | Aqueous Na$_2$CO$_3$ resulted in unreacted 3,5-diphenylpyrazole |
| 10 | Sodium methoxide in refluxing methanol resulted in unreacted 3,5-diphenylpyrazole |

EXAMPLE 11

Preparation of 1,2-dimethyl-3,5-diphenylpyrazolium methyl sulfate

1-Methyl-3,5-diphenylpyrazole (1.0 mole) prepared in accordance with Example 4 and in admixture with xylene is diluted with an equal volume of ethylene dichloride. The reaction mixture is heated to 50°C. to 55°C., and an equimolar amount or slight excess (1.05 moles) of dimethyl sulfate is added. The mixture is heated to about 105°C. to 110°C. for 4 hours. The reaction mixture is then cooled to about 15°C., and the precipitated product is filtered. The wet cake is washed with xylene, then with acetone and dried. A 93% yield of product is obtained.

The process is repeated as described above, excepting that after the alkylation is complete and the mixture cooled to 50°C., a small amount of triethylamine is added to the mixture, the mixture is heated at 50°C. for 30 minutes and then cooled. This reaction destroys excess dimethyl sulfate and improves safety in handling. Product yield is about 90% to 92%.

The above post-alkylation reaction is repeated in two separate runs employing triethylamine and pyridine with similar good results.

EXAMPLE 12

Preparation of 1,2-dimethyl-3,5-diphenylpyrazolium methyl sulfate

1-Methyl-3,5-diphenylpyrazole (1.0 mole), is prepared in accordance with the procedure of Example 4, except that the xylene is not removed. The reaction mixture is heated to 60°C., and dimethyl sulfate (1.05 moles) is then added to the mixture and the mixture heated to 105°C. to 110°C. and maintained at 105°C. to 110°C. for 8 hours. The mixture is cooled to room temperature and the precipitated product is then filtered, washed with xylene, then with acetone, and then dried. An 83% yield of product is obtained.

The reaction is repeated as described above, excepting that after the alkylation is complete, triethylamine is added to the reaction mixture at 50°C., and the mixture heated at 50°C. for 30 minutes to destroy excess dimethyl sulfate. Product yields are virtually unchanged.

The above post-alkylation reaction is repeated in two separate runs utilizing trimethylamine and pyridine with attendant good results.

EXAMPLE 13

Preparation of 1,2-dimethyl-3,5-diphenylpyrazolium methyl sulfate

1-Methyl-3,5-diphenylpyrazole (1.0 mole) is prepared in accordance with the procedure of Example 4, except that xylene used in Example 4 is not removed. About 75% of the xylene is now distilled off, and a quantity of ethylene dichloride equivalent to the xylene remaining in the reaction mixture is added. The reaction mixture is cooled to 60°C., and dimethyl sulfate (1.05 moles) is then added, and the mixture heated to 105°C. to 110°C., and maintained at 105°C. to 110°C. for about 4 hours. The mixture is cooled to 50°C., and triethylamine in an amount equal to eight mole percent based on dimethyl sulfate is added. The reaction mixture is stirred at 50°C. for 30 minutes. The reaction mixture is cooled to room temperature and then filtered. The wet cake is washed with xylene, then with acetone, and the product dried. A 90% to 92% yield of the product is obtained.

EXAMPLE 14

Preparation of 1,2-dialkyl-3,5-diphenyl(substituted or unsubstituted)pyrazolium salts Utilizing the procedure of Example 4 and the appropriately substituted 3,5-diphenylpyrazole and appropriate solvent, the 1-alkyl-3,5-diphenyl(substituted or unsubstituted) pyrazole is prepared. The thus-prepared compound is then converted to the pyrazolium salt having the structure:

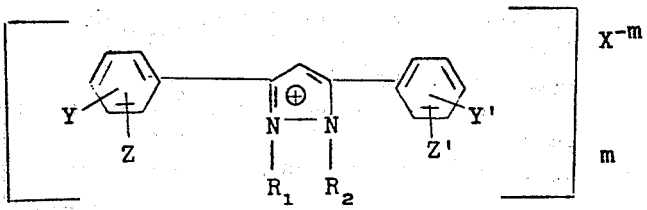

by the procedure of Example 11, 12 or 13 employing the selected solvent or solvent mixture set forth in Table II below. Product yields generally range between about 78% to 83% when a single solvent is used in the final alkylation; whereas, yields obtained using the co-solvent system in the final alkylation generally provides yields about at least 5% to 10% higher than those obtained in the single-solvent system.

TABLE II

| Ex. No. | Procedure Example 4 Solvent | Procedure Example 11 Solvent | Substituent X | Y | Y' |
|---|---|---|---|---|---|
| 18 | xylene | xylene | $OSO_2\text{-}C_6H_4\text{-}CH_3^{\ominus}$ | H | Cl (4) |
| 19 | xylene | xylene + EDC** | $OSO_3\text{—}CH_3^{\ominus}$ | H | Cl (4) |
| 20 | xylene | xylene + EDC** | $OSO_3\text{—}CH_3^{\ominus}$ | H | Cl (4) |
| 21 | xylene | xylene + CHCl₃ | $OSO_3\text{—}CH_3^{\ominus}$ | H | Cl (4) |
| 22 | xylene | xylene + CHCl₃ | — | H | H |
| 23 | MIBK* | MIBK* | $C_2H_5\text{—}SO_3\text{—}O^{\ominus}$ | H | H |
| 24 | MIBK* | MIBK* + EDC** | $CH_3SO_3O^{\ominus}$ | H | $CH_3$ (4) |
| 25 | heptane | heptane + CHCl₃ | $CH_3SO_3\text{—}O^{\ominus}$ | H | $CH_3$ (3) |
| 26 | MIBK* | MIBK* + CHCl₃ | $CH_3SO_3O^{\ominus}$ | H | Cl (3) |

| | Substituent | | | | Melting Point °C. |
|---|---|---|---|---|---|
| | Z | Z' | $R_1$ | $R_2$ | |
| 18 | H | H | $CH_3$ | $CH_3$ | 177.5–179 |
| 19 | H | H | $CH_3$ | $CH_3$ | over 340 |
| 20 | H | H | $CH_3$ | $CH_3$ | 217–219 |
| 21 | H | H | $CH_3$ | $CH_3$ | — |
| 22 | H | H | $CH_3$ | $C_3H_7$—n | — |
| 23 | H | H | $CH_3$ | $C_2H_5$ | 109–111 |
| 24 | H | H | $CH_3$ | $CH_3$ | 107–110 |
| 25 | H | H | $CH_3$ | $CH_3$ | purple gum |
| 26 | H | Cl (5) | $CH_3$ | $CH_3$ | 162–164 |

TABLE II – Continued

| Ex. No. | Procedure Example 4 Solvent | Procedure Example 11 Solvent | Substituent X | Y | Y' |
|---|---|---|---|---|---|
| 27 | bis-methoxyethyl ether | bis-methoxyethyl ether + CHCl$_3$ | HSO$_4$$^\ominus$ | NO$_2$ (4) | NO$_2$ (4) |
| 28 | toluene | toluene | CH$_3$SO$_3$O$^\ominus$ | Cl (3) | Cl (3) |
| 29 | toluene | toluene + CHCl$_3$ | CH$_3$SO$_3$O$^\ominus$ | F (3) | H |
| 30 | toluene | toluene + CHCl$_3$ | CH$_3$SO$_3$O$^\ominus$ | Cl (2) | H |
| 31 | xylene | xylene | CH$_3$SO$_3$O$^\ominus$ | CF$_3$ (3) | H |
| 32 | xylene | xylene + EDC** | HSO$_4$ ½H$_2$O$^\ominus$ | NO$_2$ (4) | NO$_2$ (4) |
| 33 | xylene | xylene + EDC** | CH$_3$SO$_3$O$^\ominus$ | CH$_3$ (3) | H |

| | Substituent Z | Z' | R$_1$ | R$_2$ |
|---|---|---|---|---|
| 27 | H | H | CH$_3$ | CH$_3$ |
| 28 | H | H | CH$_3$ | CH$_3$ |
| 29 | H | H | CH$_3$ | CH$_3$ |
| 30 | Cl (5) | H | CH$_3$ | CH$_3$ |
| 31 | H | H | CH$_3$ | CH$_3$ |
| 32 | H | H | CH$_3$ | CH$_3$ |
| 33 | CH$_3$ (5) | H | CH$_3$ | CH$_3$ |

| Ex. No. | Procedure Example 4 Solvent | Procedure Example 11 Solvent | Substituent X | Y | Y' |
|---|---|---|---|---|---|
| 34 | xylene | xylene + perchloroethylene | CH$_3$SO$_3$O$^\ominus$ | H | CH$_3$ (3) |
| 35 | toluene | toluene + EDC | HSO$_4$$^\ominus$ | H | Cl (2) |
| 36 | toluene | toluene + CHCl$_3$ | CH$_3$SO$_3$O$^\ominus$ | H | CH$_3$ (2) |
| 37 | xylene | xylene + CHCl$_3$ | CH$_3$SO$_3$O$^\ominus$ | Cl (3) | H |
| 38 | xylene | xylene + EDC** | CH$_3$SO$_3$O$^\ominus$ | Cl (3) | H |
| 39 | xylene | xylene + EDC** | HSO$_4$$^\ominus$ | Cl (4) | Cl (4) |
| 40 | MIBK | MIBK* + EDC** | CH$_3$SO$_3$O$^\ominus$ | Cl (4) | Cl (4) |
| 41 | MIBK | MIBK* + CHCl$_3$ | CH$_3$SO$_3$O$^\ominus$ | H | H |
| 42 | heptane | heptane + EDC | CH$_3$-C$_6$H$_4$-SO$_2$-O$^\ominus$ | H | H |
| 43 | heptane | heptane + EDC** | HSO$_4$$^\ominus$ | Cl (4) | H |
| 44 | xylene | xylene + EDC** | CH$_3$-C$_6$H$_4$-SO$_2$-O$^\ominus$ | CH$_3$O (4) | CH$_3$O (4) |
| 45 | heptane | heptane + CHCl$_3$ | CH$_3$SO$_3$O$^\ominus$ | CH$_3$O (4) | CH$_3$O (4) |

| | Substituent Z | Z' | R$_1$ | R$_2$ | Melting Point °C. |
|---|---|---|---|---|---|
| 34 | H | H | CH$_3$ | CH$_3$ | brown gum |
| 35 | H | H | CH$_3$ | CH$_3$ | purple gum |
| 36 | H | H | CH$_3$ | CH$_3$ | brown gum |
| 37 | Cl (5) | H | CH$_3$ | CH$_3$ | — |
| 38 | Cl (4) | H | CH$_3$ | CH$_3$ | 152–153 |
| 39 | H | H | CH$_3$ | CH$_3$ | 263–264 |
| 40 | H | H | CH$_3$ | CH$_3$ | 180–182 |
| 41 | CH$_3$ (4) | CH$_3$ (4) | CH$_3$ | CH$_3$ | 174–176 |
| 42 | CH$_3$ (4) | CH$_3$ (4) | CH$_3$ | CH$_3$ | 150–151.5 |
| 43 | H | H | CH$_3$ | CH$_3$ | 217–219 |
| 44 | H | H | CH$_3$ | CH$_3$ | 127.5–129 |
| 45 | H | H | CH$_3$ | CH$_3$ | 137–138.5 |

*MIBK is methylisobutyl ketone
**EDC is ethylene dichloride

I Claim:

1. A method for the preparation of a compound having the formula:

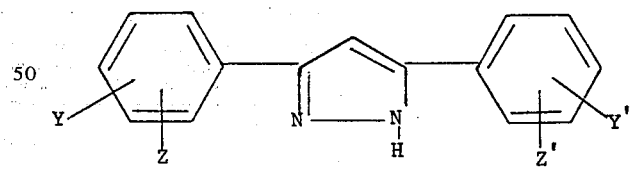

where R$_1$ is alkyl C$_1$—C$_4$ and Y, Y', Z and Z' each represent a member selected from the group consisting of hydrogen, nitro, halogen, alkyl C$_1$—C$_4$, haloalkyl C$_1$—C$_4$ containing 1 to 4 halogen groups, and alkoxy C$_1$—C$_4$, comprising the steps of: reacting (1) a compound of the formula:

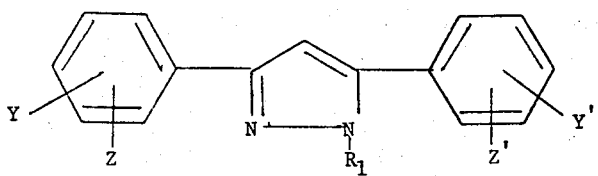

where Y, Y' Z and Z' are as defined above; with (2) from 1 to 1.5 equivalents of an alkylating agent represented by the formula (R$_1$)$_m$Q, where R$_1$ is as defined above and Q is a member selected from the group consisting of a halide, an organic sulfate, hydrogen sulfate, benzene sulfonate, C$_1$—C$_4$ alkoxybenzene sulfonate, phosphate, alkane sulfonate C$_1$—C$_4$; and m is an integer of from 1, 2 or 3; said reaction being conducted in the presence of a solid, anhydrous, inorganic, alkali metal base and a non-aqueous, inert, organic solvent at a temperature between 50°C. and 175°C., and recovering a 1-alkyl-3,5-diphenylpyrazole in good yield and purity.

2. A method according to claim 1, wherein the alkylating agent is selected from the group consisting of an alkyl halide, a dialkyl sulfate, an alkyl hydrogen sulfate, and an alkyl toluene sulfonate, wherein each alkyl group contains from 1 to 4 carbon atoms and the solvent is selected from the group consisting of an aromatic hydrocarbon, an aliphatic hydrocarbon, high aromatic solvents having a mixed aniline point between 30°F. and 95°F., an aromatic content of from 60% to 100% and a specific gravity of from 0.88 to 1.5 at 60°/60°F., an aliphatic ketone having from four to seven carbon atoms, an aliphatic alcohol having from two to eight carbon atoms, ethylene dichloride, perchloroethylene, a dipolar aprotic solvent, a cyclic ether, and an alkoxyalkyl ether.

3. A method according to claim 1, wherein $R_1$ is methyl; Y, Y', Z and Z' are each hydrogen; the alkylating agent is dimethyl sulfate; and the solvent is xylene.

4. A method according to claim 3, wherein the base is selected from the group consisting of solid anhydrous sodium hydroxide, potassium hydroxide, sodium carbonate and potassium carbonate.

5. A method according to claim 4, wherein the reaction is carried out at a temperature between 85°C. and 120°C.

6. A method for converting a compound of the formula:

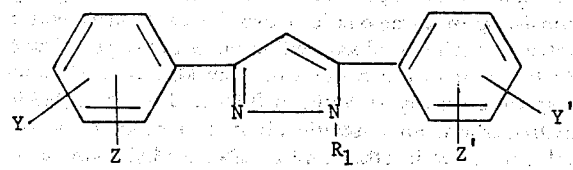

wherein $R_1$ is alkyl $C_1$—$C_4$ and Y, Y', Z and Z' each represent a member selected from the group consisting of hydrogen, halogen, nitro, alkyl $C_1$—$C_4$, haloalkyl $C_1$—$C_4$ containing from 1 to 4 halogen groups, and an alkoxy $C_1$—$C_4$, to a compound having the formula:

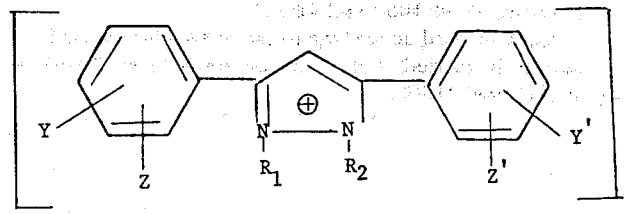

where $R_1$, Y, Y' Z and Z' are as defined above; X is an anion having a charge of from 1 to 3; and m is an integer from 1 to 3, comprising the steps of: reacting a compound of the formula:

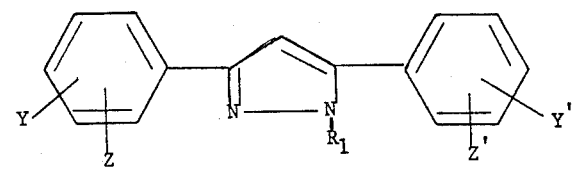

with from about 1 to 1.5 equivalents of an alkylating agent of the formula $(R_2)_mQ$, where $R_2$ is alkyl $C_1$—$C_4$, Q is a member selected from the group consisting of a halide, an organic sulfate, hydrogen sulfate, benzene sulfonate, $C_1$—$C_4$ alkoxy benzene sulfonate, $C_1$—$C_3$ alkylbenzene sulfonate, phosphate and alkane sulfonate $C_1$—$C_4$, and m is as defined above, carrying out said reaction in the presence of a non-aqueous mixture of inert organic solvents consisting of (a) a chlorinated hydrocarbon solvent and (b) an organic solvent selected from the group consisting of an aromatic hydrocarbon, an aliphatic hydrocarbon, high aromatic solvents having a mixed aniline point between 30°F. and 60°F., an aromatic content between 60% and 100% and a specific gravity at 60°/60°F. of 0.88 to 1.5, an aliphatic ketone, a dipolar aprotic solvent, a cyclic ether, an aliphatic alcohol and an alkoxy-alkyl ether, at a temperature between 50°C. and 175°C., and recovering a 1,2-dialkyl-3,5-diphenylpyrazolium salt in good yield and purity.

7. A method according to claim 6 wherein the reaction is conducted at a temperature of from 105°C.–110°C.

8. A method according to claim 6, wherein the solvent mixture consists of from about 10% to 90%, by volume, of a solvent selected from the group consisting of an aromatic hydrocarbon solvent and an aliphatic hydrocarbon solvent, a high aromatic solvent having a mixed aniline point between 30°F. and 95°F., an aromatic content of 60% to 100% and a specific gravity at 60°/60°F. between 0.88 and 1.5, and from about 90% to 10%, by volume, of a chlorinated hydrocarbon solvent.

9. A method according to claim 6, wherein $R_1$ and $R_2$ are methyl; Y, Y', Z and Z' are hydrogen; the alkylating agent is dimethyl sulfate; m is 1; and X is monomethyl sulfate; and the solvent employed is xylene.

10. A method according to claim 9, wherein the solvent is a mixture of xylene and ethylene dichloride.

11. A method according to claim 6, wherein the reaction mixture is heated, following completion of the alkylation step, with an anhydrous tertiary-amine, whereby unreacted alkylating agent is destroyed.

12. A method according to claim 9, wherein the reaction mixture is heated, following completion of the alkylation, with an anhydrous tertiary-amine, whereby residual alkylating agent is destroyed.

13. A method according to claim 10, wherein the reaction mixture is heated, following completion of the alkylation, with an anhydrous tertiary-amine, whereby residual alkylating agent is destroyed.

14. A method for the preparation of a 1,2-dialkyl-3,5-diphenylpyrazolium salt having the formula:

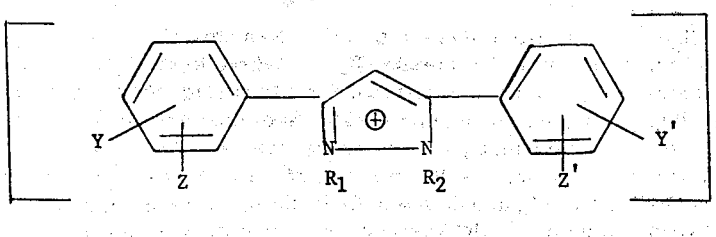

wherein $R_1$ and $R_2$ are alkyl $C_1$—$C_4$; Y, Y', Z and Z' each represent a member selected from the group consisting of hydrogen, nitro, halogen, alkyl $C_1$—$C_4$, haloalkyl $C_1$—$C_4$ containing 1 to 4 halogen, alkyl $C_1$—$C_4$; haloalkyl $C_1$—$C_4$; X is an anion having a charge of from 1 to 3; and m is an integer from 1 to 3 comprising the steps of: reacting (1) a compound of the formula:

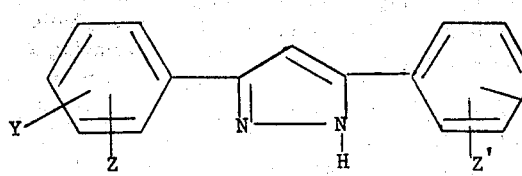

wherein Y, Y', Z and Z' are as described above; with (2) from 1 to 1.5 equivalents of an alkylating agent represented by the formula $(R_1)_mQ$, wherein $R_1$ and m are as defined above; and Q is a member selected from a halide, an organic sulfate, hydrogen sulfate, benzene sulfonate, $C_1$—$C_4$ alkoxybenzene sulfonates, phosphate, and alkane sulfonates $C_1$—$C_4$; carrying out said reaction in the presence of a solid, anhydrous, inorganic, alkali metal base and a non-aqueous, inert organic solvent at a temperature between 50°C. and 175°C., to obtain a compound having the formula:

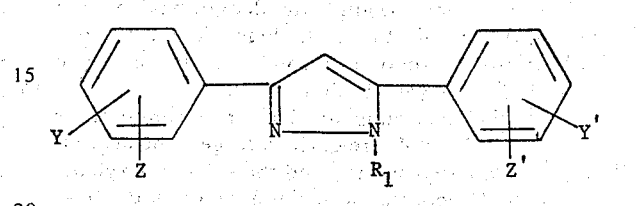

wherein Y, Y', Z and Z' and $R_1$ are as defined above; and reacting said compound with from about 1 to 1.5 equivalents of an alkylating agent of the formula $(R_2)_mQ$, where $R_2$, m and Q are as defined above, in the presence of a non-aqueous mixture of inert organic solvents consisting of (a) a chlorinated hydrocarbon solvent and (b) an organic solvent selected from the group consisting of an aromatic hydrocarbon, high aromatic solvents having a mixed aniline point between 30° and 95°F., an aromatic content of from 60% to 100% and a specific gravity at 60°F. of 0.88 to 1.5, an aliphatic hydrocarbon, an aliphatic alcohol, a dipolar aprotic solvent, a cyclic ether and an alkoxyalkyl ether, at a temperature between about 50°C. and 175°C., and recovering said 1,2-dialkyl-3,5-diphenylpyrazolium salt in good yield and purity.

15. A method according to claim 14, wherein $R_1$ and $R_2$ are methyl; Y, Y', Z and Z' are each hydrogen; X is mono-methyl sulfate; m is 1; the solvent in the monoalkylation step is xylene and the co-solvent mixture in the quaternarization is a mixture of xylene and ethylene dichloride in approximately 50/50 proportions and where in said reaction is carried out at a temperature between about 105° and 110°C.

16. A method according to claim 14 wherein said reaction is carried out at a temperature of between 105°C. and 110°C.

* * * * *